(12) United States Patent
Yan

(10) Patent No.: US 8,164,707 B2
(45) Date of Patent: Apr. 24, 2012

(54) ADJUSTABLE FRAME ASSEMBLY FOR FLAT PANEL DISPLAY

(75) Inventor: Shuo-Ting Yan, Miao-Li (TW)

(73) Assignee: Innolux Display Corporation (TW)

( * ) Notice: Subject to any disclaimer, the term of this patent is extended or adjusted under 35 U.S.C. 154(b) by 1316 days.

(21) Appl. No.: 11/879,269

(22) Filed: Jul. 16, 2007

(65) Prior Publication Data

US 2008/0024695 A1    Jan. 31, 2008

(30) Foreign Application Priority Data

Jul. 14, 2006   (TW) .............................. 95125819 A

(51) Int. Cl.
*G02F 1/1333*    (2006.01)
(52) U.S. Cl. .......................................... 349/60; 349/58

(58) Field of Classification Search ............... 349/58–60
See application file for complete search history.

(56) References Cited

U.S. PATENT DOCUMENTS 5,419,626 A * 5/1995 Crockett ...................... 312/7.2
6,130,382 A   10/2000 Hung
7,006,169 B2  2/2006 Liu

* cited by examiner

*Primary Examiner* — Dung T. Nguyen
(74) *Attorney, Agent, or Firm* — Bacon & Thomas PLLC

(57) ABSTRACT

An exemplary frame assembly (20) includes a first frame (21), a second frame (22), a third frame (23) accommodating at least part of the first frame and at least part of the second frame. The first, second and third frames cooperatively define an accommodating space of the frame assembly, and the positions of the first frame and the second frame relative to each other are adjustable such that the accommodating space has a desired size.

20 Claims, 6 Drawing Sheets

ADJUSTABLE FRAME ASSEMBLY FOR FLAT PANEL DISPLAY

CROSS-REFERENCE TO RELATED APPLICATION

This application is related to, and claims the benefit of, a foreign priority application filed in Taiwan as Serial No. 095125819 on Jul. 14, 2006. The related application is incorporated herein by reference.

FIELD OF THE INVENTION

The present invention relates to frame assemblies, and more particularly to a frame assembly used in a flat panel display.

GENERAL BACKGROUND

The flat panel displays (FPDs) generally include liquid crystal displays (LCDs), plasma display panels (PDPs), and organic light emitting displays (OLEDs). These kinds of displays are in widespread use due to advantages such as their portability, power saving, and low radiation. A flat panel display generally includes a display panel, and a frame assembly for accommodating the display panel.

Referring to FIG. 10, a typical frame assembly 10 of a flat panel display includes a back plate 110, a middle frame 120, and a front frame 130. The middle frame 120 is disposed between the back plate 110 and the front frame 130.

The middle frame 120 includes an upper board 121, a lower board 122, and two side walls 123. The sidewalls 123 are opposite to each other, and are disposed between the upper board 121 and the lower board 122. Each of the sidewalls 123 includes two protrusions 124 extending toward the back plate 110, and two protrusions 124 extending toward the front frame 130. The back plate 110 has four sockets 125 respectively corresponding to the protrusions 124 that extend toward the back plate 110. The front frame 130 has four sockets 125 respectively corresponding to the protrusions 124 that extend toward the front frame 130. The back plate 110 together with the middle frame 120 and the front frame 130 cooperatively provide an accommodating space, by means of the engagement of the protrusions 124 in the sockets 125.

However, the accommodating space provided by the back plate 110, the middle frame 120 and the front frame 130 has a certain fixed size. Thus the frame assembly 10 can only accommodate a display panel with a particular predetermined size. The frame assembly 10 cannot accommodate display panels with different sizes.

What is needed, therefore, is a new frame assembly for an FPD that can overcome the above-described deficiencies.

SUMMARY

In one preferred embodiment, a frame assembly includes a first frame, a second frame, a third frame accommodating at least part of the first frame and at least part of the second frame. The first, second and third frames cooperatively define an accommodating space of the frame assembly, and the positions of the first frame and the second frame relative to each other are adjustable such that the accommodating space has a desired size.

Other aspects, novel features and advantages will become more apparent from the following detailed description when taken in conjunction with the accompanying drawings.

BRIEF DESCRIPTION OF THE DRAWINGS

The components in the drawings are not necessarily drawn to scale, the emphasis instead being placed upon clearly illustrating the principles of at least one embodiment of the present invention. In the drawings, like reference numerals designate corresponding parts throughout various views, and all the views are schematic.

DETAILED DESCRIPTION OF PREFERRED EMBODIMENTS

Reference will now be made to the drawings to describe preferred and exemplary embodiments in detail.

Figure 1:
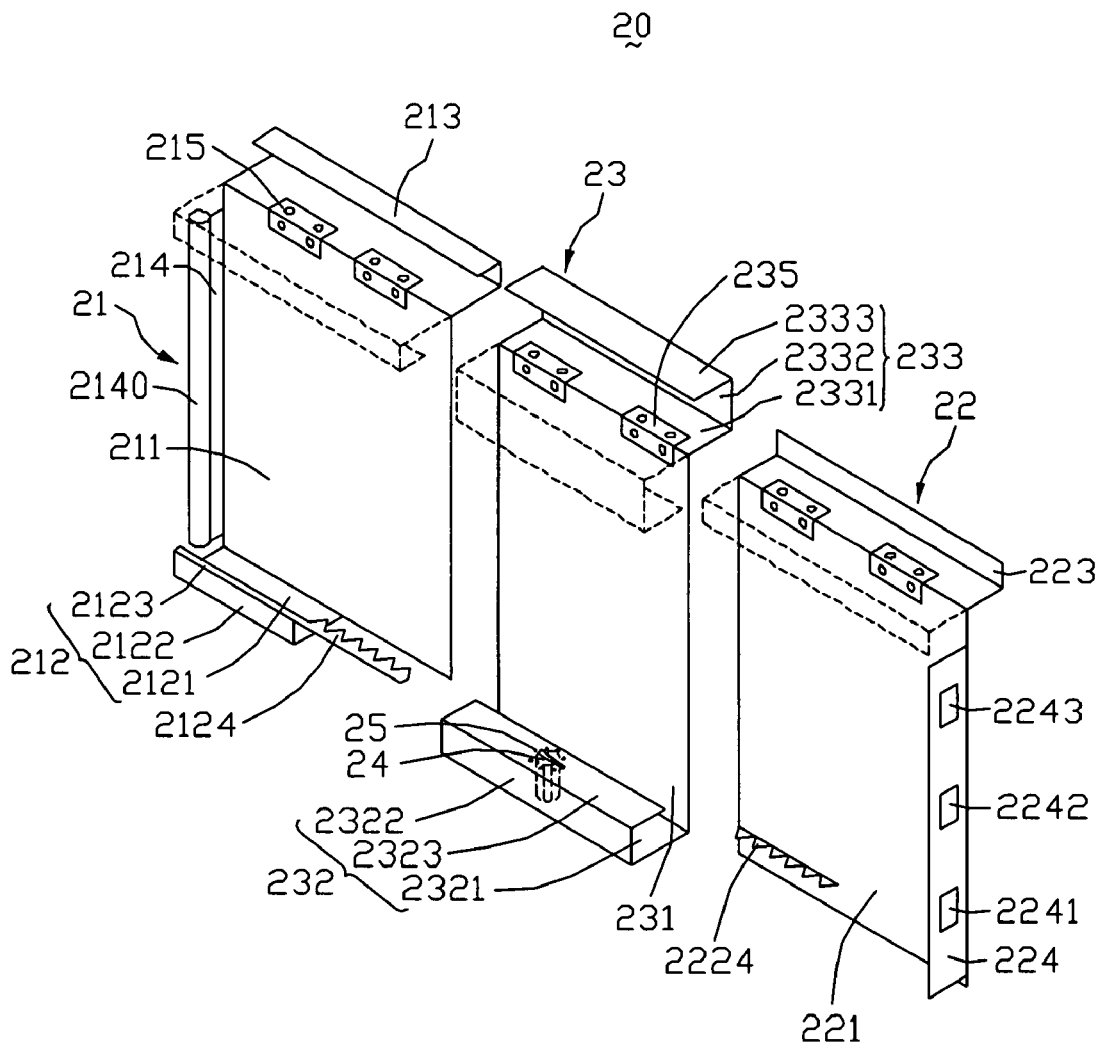
FIG. 1 is an exploded, isometric view of a frame assembly according to a first embodiment of the present invention, the frame assembly including a first frame, a second frame, and a third frame, the first frame including a first sidewall, the third frame including a first upper cover and a locking device, the first sidewall including a roller, the first, second and third upper covers each shown in an open position.

Referring to FIG. 1, a frame assembly 20 according to a first embodiment of the present invention is shown. The frame assembly 20 includes a first frame 21, a second frame 22, and a third frame 23 between the first frame 21 and the second frame 22. The third frame 23 includes a first back plate 231, a first lower cover 232, and a first upper cover 233. The first upper cover 233 can be pivoted forward and down or backward and up.

Figure 2:
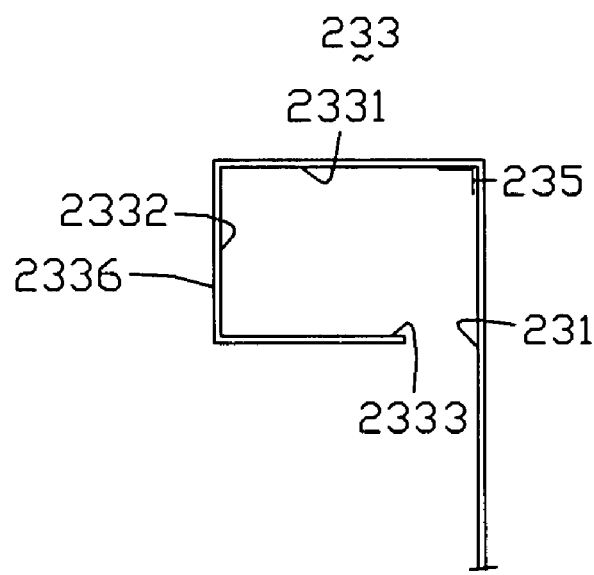
FIG. 2 is an enlarged, side view of the first upper cover and an upper portion of the third frame of FIG. 1, but showing the first upper cover in a closed position.

Referring also to FIG. 2, the first upper cover 233 of the third frame 23 includes a first portion 2331, a second portion 2332, and a third portion 2333. The first and third portions 2331, 2333 perpendicularly extend from the second portion 2332, respectively. Moreover, the first portion 2331 is pivotably attached to the first back plate 231 by two hinges 235. The first upper cover 233 further includes a light shielding film 2336 covering outer surfaces (not labeled) of the first, second and third portions 2331, 2332, 2333.

The first lower cover 232 extends from a bottom end of the first back plate 231, and is symmetrically opposite the first upper cover 233 when the first upper cover 233 is in a "closed" position (shown in phantom in FIG. 1). The first lower cover 232 includes a fourth portion 2321, a fifth portion 2322, and a sixth portion 2323. The fourth and sixth portions 2321, 2323 perpendicularly extend from the fifth portion 2322, respectively. Moreover, the fourth portion 2321 extends from a bottom end of the first back plate 231. The first lower cover 232 further includes a locking device 24 located generally between the fourth and sixth portions 2321, 2323. The sixth portion 2323 has a plurality of through holes 25 defined therein. The through holes 25 are arranged in a circle, corresponding to the position of the locking device 24.

Figure 3:
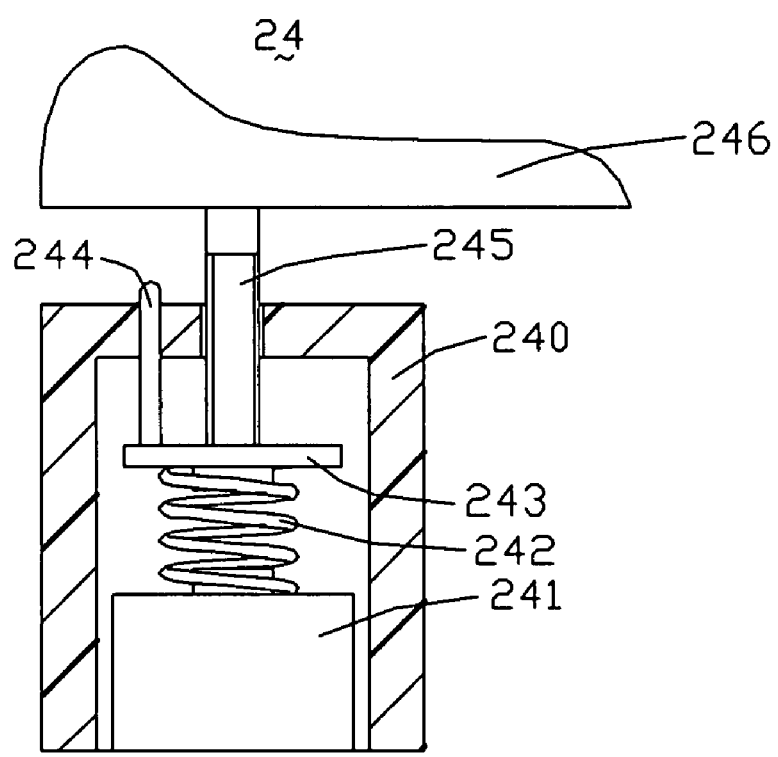
FIG. 3 is essentially an enlarged, side view of the locking device of FIG. 1, the locking device including a gear, the gear being shown in cross-section.

Referring also to FIG. 3, the locking device 24 includes a generally cylindrical, hollow gear 240, a rotating handle 246, a rotating axle 245, a base 241, a spring 242, and a baffle 243. The baffle 243, the spring 242 and the base 241 are disposed inside the gear 240. The base 241 is disposed on an inside bottom surface (not labeled) of the gear 240. One end of the spring 242 is connected to the base 241 and the other end of the spring 242 is connected to the baffle 243. A bottom end of the rotating axle 245 is fixed to the baffle 243. The rotating axle 245 extends up and through a through hole (not labeled) defined in a middle of a top wall (not labeled) of the gear 240. A top end of the rotating axle 245 is connected to the rotating handle 246, which is located above the top wall of the gear 240.

Figure 4:
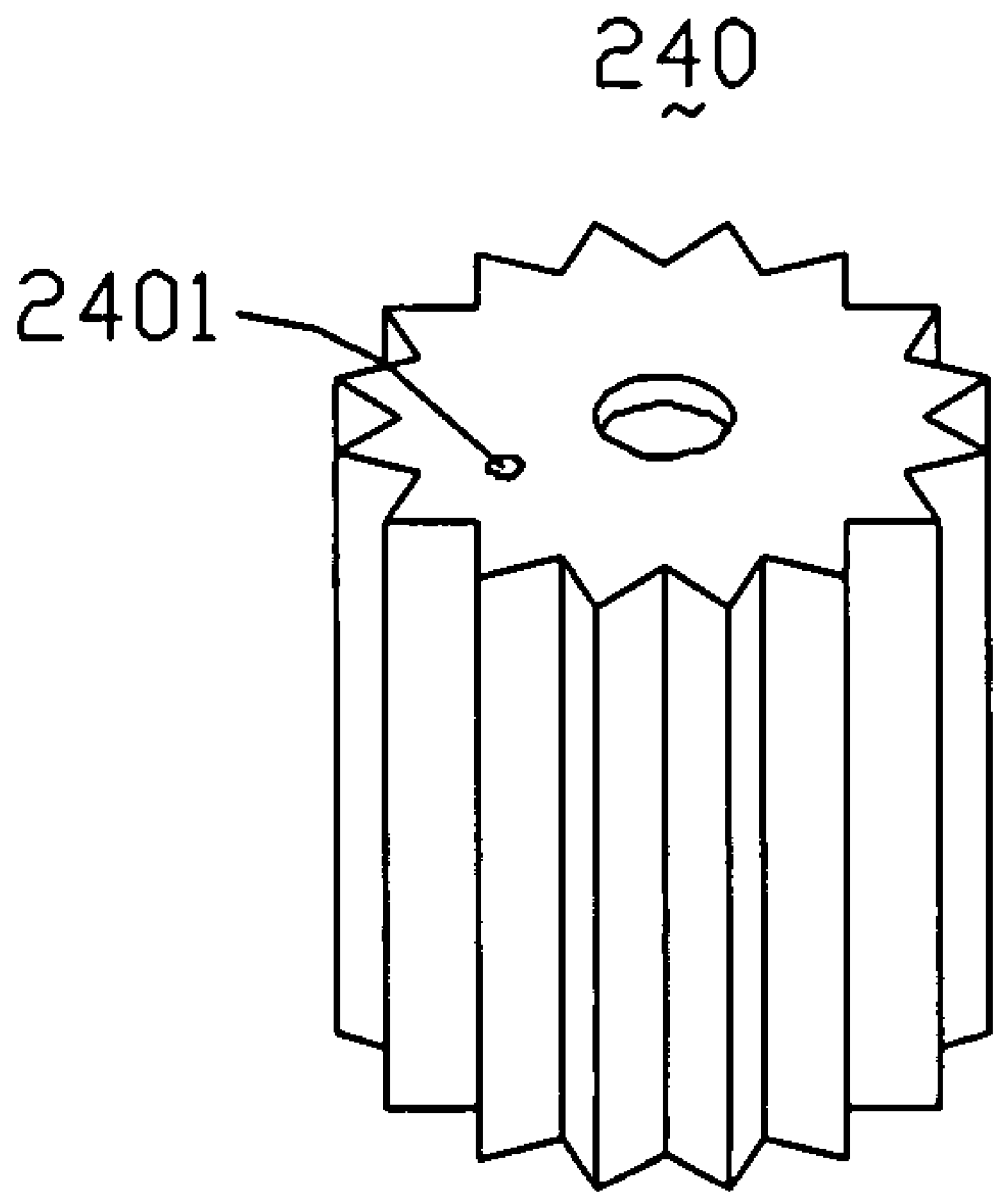
FIG. 4 is an isometric view of the gear of FIG. 3.

Referring also to FIG. 4, the top wall of the gear 240 has a hole 2401 defined therein. The baffle 243 includes a post 244 extending up from a top surface (not labeled) thereof. A diameter of the hole 2401 is slightly larger than a diameter of the post 244. The post 244 extends through the hole 2401. In a normal position when no pressure is applied to the spring 242, the post 244 protrudes out from the hole 2401. Further, in this position, the post 244 extends up through and is engaged in a selected one of the through holes 25 of the sixth portion 2323.

The first frame 21 includes a second back plate 211, a second lower cover 212, a first sidewall 214, and a second upper cover 213. The second upper cover 213 is pivotably attached to the second back plate 211 by two hinges 215. The second lower cover 212 and the first sidewall 214 perpendicularly extend from the second back plate 211, respectively. The second lower cover 212 is located symmetrically opposite to the second upper cover 213 when the second upper cover 213 is in a "closed" position (shown in phantom in FIG. 1). The first sidewall 214 is located at a vertical edge of the back plate 211, and is generally perpendicular to the second lower cover 212 and the second upper cover 213.

The second lower cover 212 includes a seventh portion 2121, an eighth portion 2122, and a ninth portion 2123. The seventh and ninth portions 2121, 2123 perpendicularly extend from the second portion 2122, respectively. Moreover, the seventh portion 2121 extends from a bottom end of the second back plate 211. A length of the seventh portion 2121 is less than a length of a bottom edge of the second back plate 211 where the seventh portion 2121 is located. The eighth portion 2122 has the same length as the seventh portion 2121. The ninth portion 2123 includes a main body, and a first toothed rack 2124 extending from an end of the main body. A total length of the ninth portion 2123 is the same as the length of the bottom edge of the second back plate 211. The second upper cover 213 has a structure similar to that of the first upper cover 233. The first sidewall 214 includes a roller 2140. The roller 2140 includes a rolled-up flexible optical film (not labeled). The flexible optical film can be a flexible board or a flexible black screen, either of which is configured for improving an optical contrast of an FPD employing the frame assembly 20.

Figure 5:
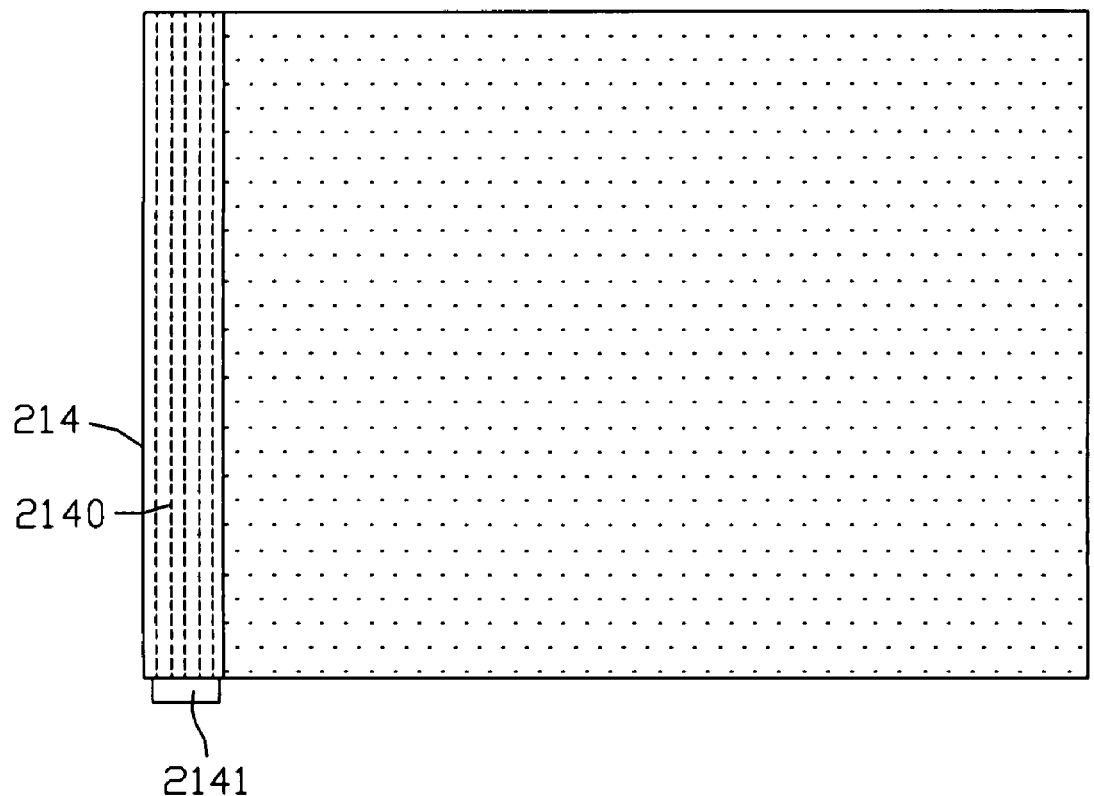
FIG. 5 is an enlarged, plan view of the roller of FIG. 1, showing a flexible optical film thereof unrolled from a rolling shaft thereof.

Referring also to FIG. 5, this shows the roller 2140 when the flexible optical film is unrolled. The roller 2140 has a rolling shaft 2141. The flexible optical film can be rolled up around the rolling shaft 2141.

The second frame 22 includes a third back plate 221, a third upper cover 223, and a second sidewall 224. The third back plate 221 has a second toothed rack 2224 at a bottom end thereof. The second toothed rack 2224 is soldered onto the third back plate 221. The second sidewall 224 includes a luminance detector 2241, a saturation detector 2243, and a control circuit 2242 electrically connected to the luminance detector 2241 and the saturation detector 2243. The luminance detector 2241 can detect a luminance of an image shown on a display panel of the FPD. The saturation detector 2243 can detect a saturation of the image shown on the display panel. The control circuit 2242 can generate a feedback signal according to the measurements of the luminance detector 2241 and the saturation detector 2243, so as to modulate the displayed image.

The third frame 23 accommodates the first frame 21 and the second frame 22. The first frame 21 and the second frame 22 can be moved relative to each other. The locking device 24 of the third frame 23 can fix the positions of the first frame 21 and the second frame 22 relative to each other and relative to the third frame 23. Therefore, the frame assembly 20 can form an accommodating space having a selected size according to a particular size of display panel desired to be installed in the frame assembly 20. That is, the frame assembly 20 can accommodate display panels with different sizes.

Detailed steps of changing the size of the accommodating space of the frame assembly 20 according to different sizes of display panels are as follows:

First, the rotating handle 246 is pressed down, so that the post 244 is disengaged from the through hole 25 of the sixth portion 2323, but remains in the hole 2401 of the gear 240. In this process, the spring 242 is compressed. Thus the locking device 24 is unlocked and can be rotated freely.

Second, the first frame 21 and the second frame 22 are pulled or pushed to desired positions. In these processes, the locking device 24 is rotated by reason of meshing of the first toothed rack 2124 with the gear 240 and by reason of meshing of the second toothed rack 2224 with the gear 240.

Third, when the frame assembly 20 has reached an arrangement where the accommodating space has a desired size, the pressure on the rotating handle 246 is released. The spring 242 elastically rebounds, and the post 244 extends up through another one of the through holes 25 of the sixth portion 2323 and is engaged in that through hole 25. Thereby, the gear 24 is locked in position and cannot rotate. In this position, the first and second sidewalls 214, 224 are located opposite to each other. The third frame 23 accommodates part of the second frame 22 and part of the first frame 21. When the desired size of the accommodating space is quite small, the first frame 21 may even accommodate part of the second frame 22 (as well as the third frame 23 accommodating part of the second frame 22).

Fourth, the first, second and third upper covers 233, 213, 223 are opened, and a display panel with the desired size is inserted into the frame assembly 20.

Sixth, the first, second and third upper covers 233, 213, 223 are closed.

Seventh, the flexible optical film of the roller 2140 is unrolled from the rolling shaft 2141. The flexible optical film is unrolled such that it fits the size of the frame assembly 20.

Figure 6:
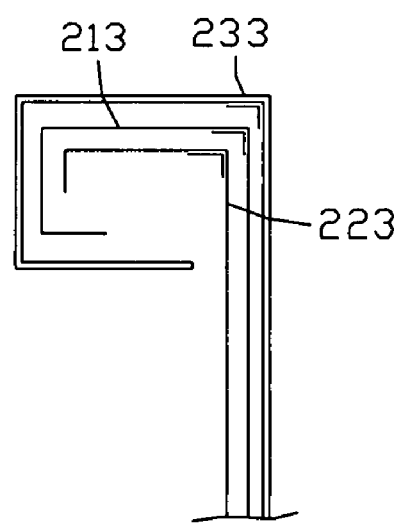
FIG. 6 is an enlarged, side cross-sectional view of the first, second and third upper covers and upper of portions of the first, second and third frames of FIG. 1, but showing the first, second and third upper covers in closed positions and assembled together.

Referring also to FIG. 6, this is an enlarged, side cross-sectional view of the first, second and third upper covers 233, 213, 223 and upper of portions of the first, second and third frames 21, 22, 23, showing the first, second and third upper covers 233, 213, 223 in the closed positions and assembled together. By means of the gear 240 of the locking device 24 cooperating with the first rack 2124 of the first frame 21 and the second toothed rack 2224 of the second frame 22, the positions of the first frame 21 and the second frame 22 relative to each other and relative to the third frame 23 can be adjusted. Therefore, the size of the accommodating space of the frame assembly 20 is conveniently adjustable so as to accommodate any one of display panels having different sizes.

Figure 7:
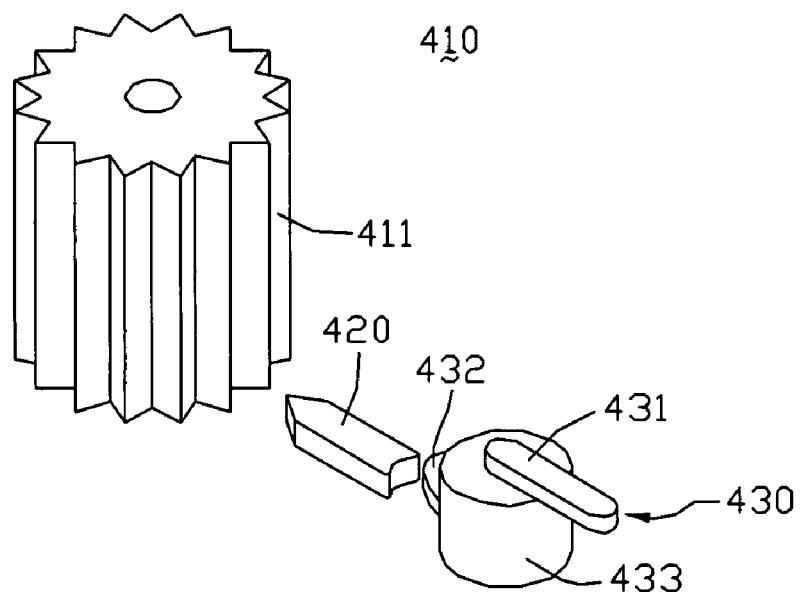
FIG. 7 is an exploded, isometric view of a locking device of a frame assembly according to a second embodiment of the present invention.

Referring to FIG. 7, a locking device 410 of a frame assembly according to a second embodiment of the present invention is shown. The frame assembly is similar to the frame assembly 20. However, the locking device 410 includes a toothed gear 411, a flexible pawl 420, and a switch 430 capable of controlling the flexible pawl 420. The switch 430 includes a turn button 431, a nose 432 and a support base 433 interconnecting the turn button 431 and the nose 432. The turn button 431 can be turned between an "on" position and an "off" position, which respectively correspond to an on-state and an off-state of the locking device 410.

Figure 8:
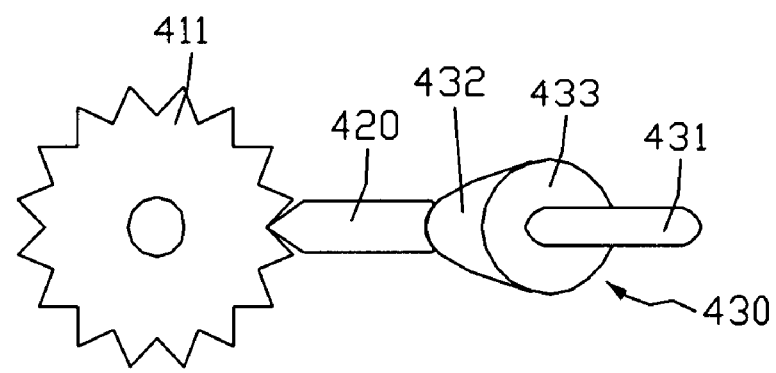
FIG. 8 is a top plan view of the locking device of FIG. 6 when fully assembled, showing the locking device in an on-state.

Referring also to FIG. 8, this shows the locking device 410 in the on-state. The turn button 431 is located in the "on" position. The nose 432 urges the flexible pawl 420. The flexible pawl 420 is thus engaged with the teeth of the gear 411, and locks the gear 411 in position.

Figure 9:
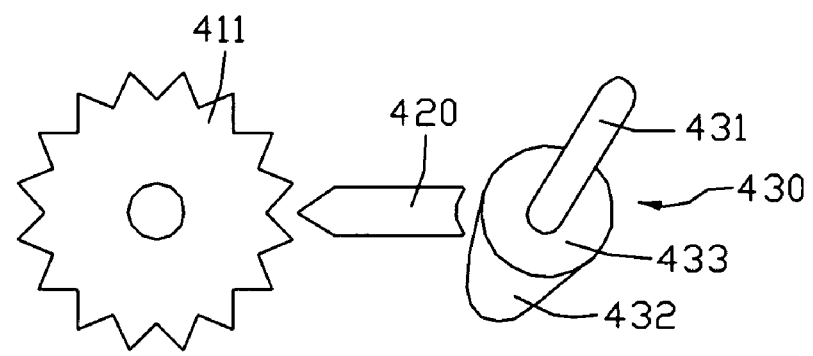
FIG. 9 is similar to FIG. 8, but showing the locking device in an off-state.
Figure 10:
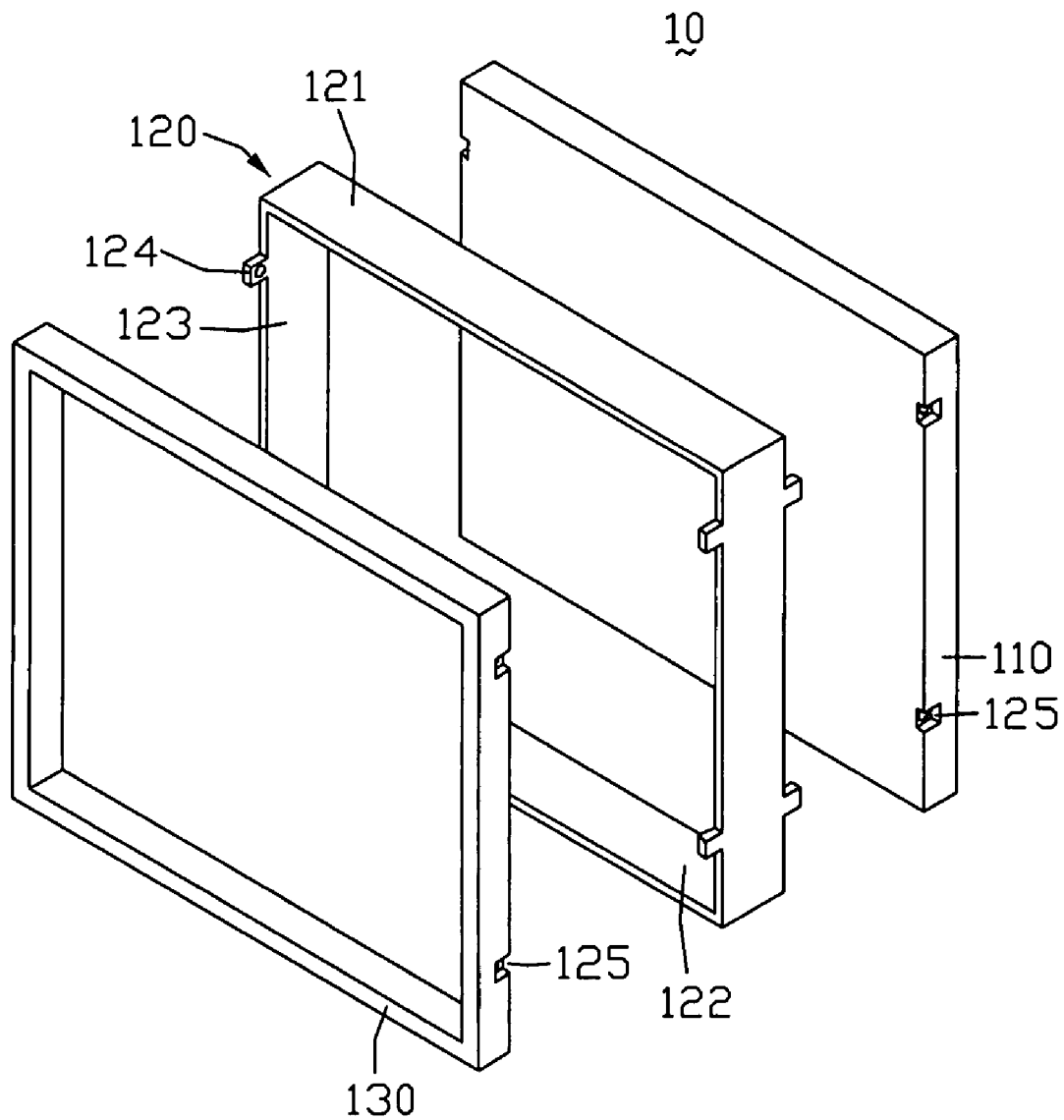
FIG. 10 is an exploded, isometric view of a conventional frame assembly of a flat panel display.

Referring also to FIG. 9, this shows the locking device 410 in the off-state. The turn button 431 is located in the "off" position. The nose 432 is clear of the flexible pawl 420. The flexible pawl 420 is thus elastically retracted in an original non-urged position clear of the teeth of the gear 411. Thus the gear 411 can move freely, and the size of the accommodating space of the frame assembly 20 can be adjusted.

It is believed that the present embodiments and their advantages will be understood from the foregoing description, and it will be apparent that various changes may be made thereto without departing from the spirit or scope of the invention or sacrificing all of its material advantages, the examples hereinbefore described merely being preferred or exemplary embodiments of the invention.

What is claimed is:

1. A frame assembly for a flat panel display, the frame assembly comprising:
   a first frame;
   a second frame; and
   a third frame accommodating at least part of the first frame at one side of the third frame, and accommodating at least part of the second frame at an opposite side of the third frame, the third frame comprising a first back plate, a first lower cover extending from a bottom end of the first back plate, and a first upper cover hingedly attached to a top end of the first back plate, the lower cover comprising a rotatable locking device meshed with the first frame and the second frame;
   wherein when the first and second frames are slid relative to each other, the locking device rotates correspondingly, and when the first and second frames have reached desired positions, the first and second frames are locked in the desired positions by the locking device.

2. The frame assembly in claim 1, wherein the first frame is fixed to the third frame and the second frame is adjustable or the second frame is fixed to the third frame and the first frame is adjustable.

3. A frame assembly for a flat panel display, the frame assembly comprising:
   a first frame having a first toothed rack;
   a second frame having a second toothed rack; and
   a third frame accommodating at least part of the first frame at one side of the third frame, and accommodating at least part of the second frame at an opposite side of the third frame, the third frame comprising a first back plate, and a first lower cover extending from a bottom end of the first back plate, and the lower cover comprising a rotatable device;
   wherein the first and second toothed racks are located at two opposite sides of the rotatable device and mesh with the rotatable device, the rotatable device is rotatable relative to the first and the second toothed racks, and the first and second frames are moveable relative to each other; and
   when the first and second frames move relative to each other, the first and second toothed racks move relative to each other and drive the rotatable device to rotate; and when the first and second frames reach desired positions, the first and second frames are locked in the desired positions by the rotatable device.

4. The frame assembly in claim 3, wherein the rotatable device comprises a hollow gear, and a spring, a baffle and a base accommodated inside the gear, the spring is disposed between the baffle and the base, and the first and second toothed racks are meshed with the gear.

5. The frame assembly in claim 4, wherein the base is disposed on an inside bottom surface of the gear, one end of the spring is connected to the base, and the other end of the spring is connected to the baffle.

6. The frame assembly in claim 5, wherein the rotatable device further comprises a rotating axle, a rotating handle, and a post, a bottom end of the rotating axle is fixed to the baffle, the rotating axle extends up and through a first through hole defined in a middle of a top wall of the gear, and a top end of the rotating axle is connected to the rotating handle which is located above the top wall of the gear.

7. The frame assembly in claim 6, wherein the post extends up from a top surface of the baffle, the top wall of the gear defines a second through hole beside the first through hole, and the post extends through the second through hole, the first lower cover comprises a first portion, a second portion, and a third portion, the first and third portions perpendicularly extend from the second portion, and the first portion extends from a bottom end of the first back plate, and the third portion defines a plurality of third through holes arranged in a circle, corresponding to the rotatable device; when no pressure is applied to the spring, the post protrudes out from the second through hole, further extends up through the second through hole and is engaged in a selected one of the third through holes; when the rotating handle is pressed down, the spring is compressed between the baffle and the base, the post disengages from the selected one of the third through holes, and remains in the second through hole, the rotatable device is unlocked and is capable of rotating freely, and the positions of the first frame and the second frame relative to each other are adjustable such that the accommodating space has a desired size; and when the first and second frames reach the desired positions, the pressure on the rotating handle is released, the spring elastically rebounds, and the post extends up through and is engaged in another one of the third through holes, and the gear is locked and stopped from rotating such that the first and second frames are locked in the desired positions by the rotatable device.

8. The frame assembly in claim 3, wherein the rotatable device comprises a toothed gear, a flexible pawl, and a switch capable of controlling the flexible pawl, the switch comprises a turn button, a nose and a support base interconnecting the turn button and the nose, and the turn button is capable of turning between an on position and an off position which respectively correspond to an on-state and an off-state of the rotatable device.

9. The frame assembly in claim 8, wherein when the turn button is located in the on position, the rotatable device is in the on-state, the nose urges the flexible pawl, and the flexible pawl is engaged with teeth of the toothed gear and locks the toothed gear in position; and when the turn button is located in the off position, the nose is clear of the flexible pawl, the flexible pawl is elastically retracted in an original non-urged position clear of the teeth of the toothed gear, the toothed gear is capable of rotating freely, and the size of the accommodating space of the frame assembly is adjustable.

10. The frame assembly in claim 3, wherein the first frame comprises a second back plate, a second lower cover, a first sidewall, and a second upper cover, the second lower cover extends from a bottom end of the second back plate, the second upper cover is hingedly attached to a top end of the second back plate, and the first sidewall is located at a vertical edge of the back plate, and is substantially perpendicular to the second lower cover and the second upper cover.

11. The frame assembly in claim 10, wherein the second lower cover comprises a fourth portion, a fifth portion, and a sixth portion, the fourth and sixth portions perpendicularly extend from the fifth portion, the fourth portion extends from a bottom end of the second back plate, and the first toothed rack extends from an end of the sixth portion and faces towards the second back plate.

12. The frame assembly in claim 11, wherein the second frame comprises a third back plate, a second sidewall, and a third upper cover, the second sidewall extends from a side of the third back plate, the third upper cover is hingedly attached to a top end of the third back plate, and the second toothed rack is positioned on the third back plate, and meshed with the rotatable device.

13. The frame assembly in claim 10, wherein the first sidewall comprises a roller, the roller comprises a flexible optical film, and the flexible optical film is a flexible board or a flexible black screen, which is configured for improving an optical contrast of the flat panel display.

14. The frame assembly in claim 13, wherein the second sidewall comprises a luminance detector, a saturation detector, and a control circuit coupled to the luminance detector and the saturation detector.

15. The frame assembly in claim 14, wherein the luminance detector is configured for detecting a luminance of an image shown on a display panel of the flat panel display, the saturation detector is configured for detecting a saturation of the image shown on the display panel, and the control circuit is configured for generating a feedback signal according to measurements of the luminance detector and the saturation detector, so as to modulate the image shown.

16. The frame assembly in claim 3, wherein the second toothed rack of the second frame is soldered onto the third back plate.

17. The frame assembly in claim 3, wherein the first frame is fixed to the third frame and the second frame is adjustable.

18. The frame assembly in claim 3, wherein the second frame is fixed to the third frame and the first frame is adjustable.

19. The frame assembly in claim 3, wherein the first upper cover further comprises a light shielding film covering an outer surface thereof.

20. A frame assembly for a flat panel display, the frame assembly comprising:
a first frame having a first rack;
a second frame having a second rack; and
a third frame accommodating at least part of the first frame at one side of the third frame, and accommodating at least part of the second frame at an opposite side of the third frame, the third frame comprising a rotatable locking device, and the rotatable locking device comprising a gear;
wherein the first and second racks are meshed with the gear of the rotatable locking device, and the gear is rotatable relative to the first and the second racks; and
when the rotatable locking device is unlocked, the first and second frames are moveable relative to each other, and movement of each of the first and second racks is in unison with the movement of each of the first and the second frames, a rotational movement of the gear of the rotatable locking device is performed by a linear movement of each of the first and second racks, and when the first and second frames are moved and reach desired positions, the first and second frames are locked in the desired positions by the rotatable locking device.

* * * * *